T. H. SCHEFFER.
MOLE TRAP.
APPLICATION FILED FEB. 28, 1912.
1,049,406.
Patented Jan. 7, 1913.
2 SHEETS—SHEET 1.
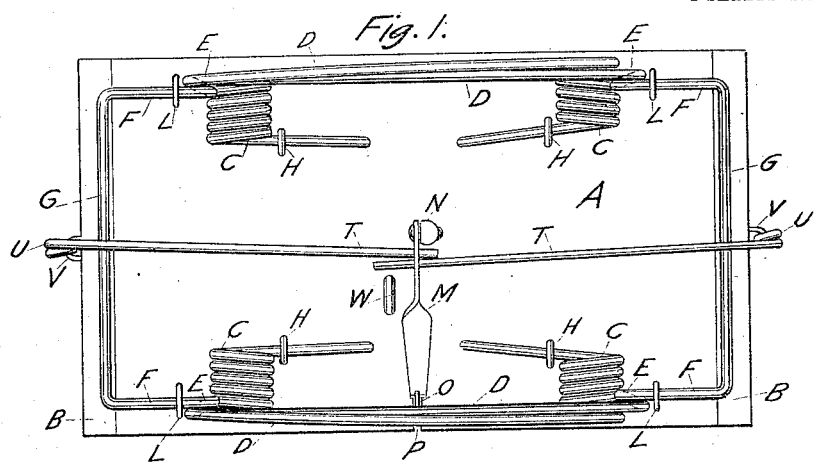
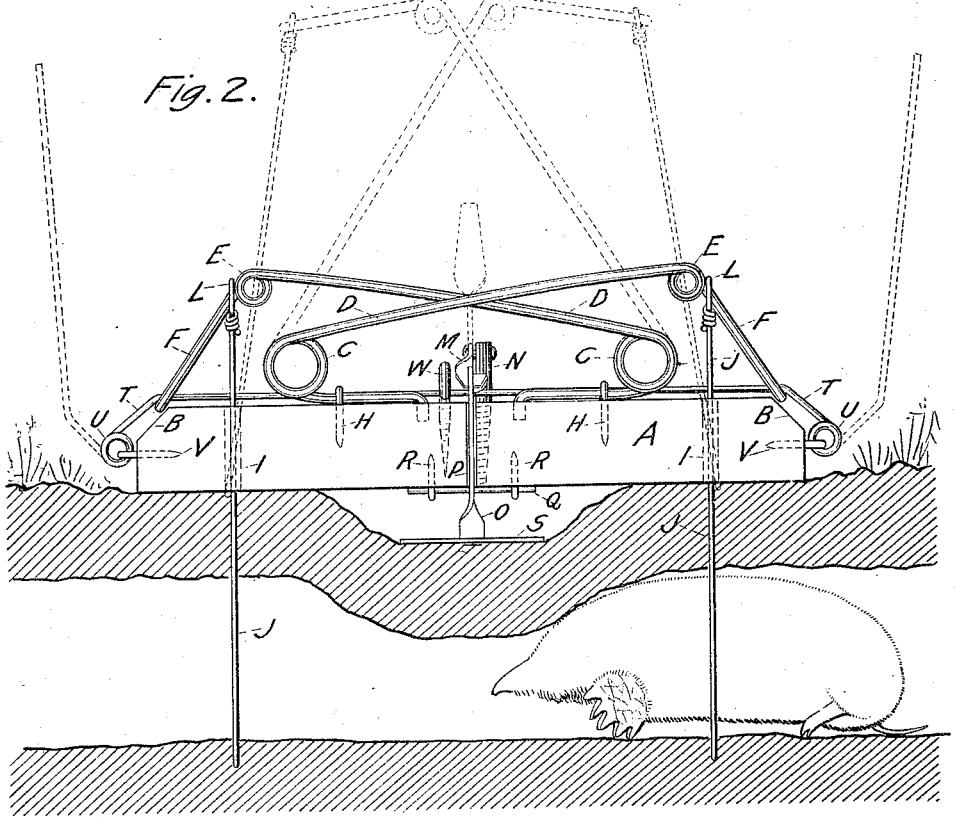

T. H. SCHEFFER.
MOLE TRAP.
APPLICATION FILED FEB. 28, 1912.
1,049,406.
Patented Jan. 7, 1913.
2 SHEETS—SHEET 2.
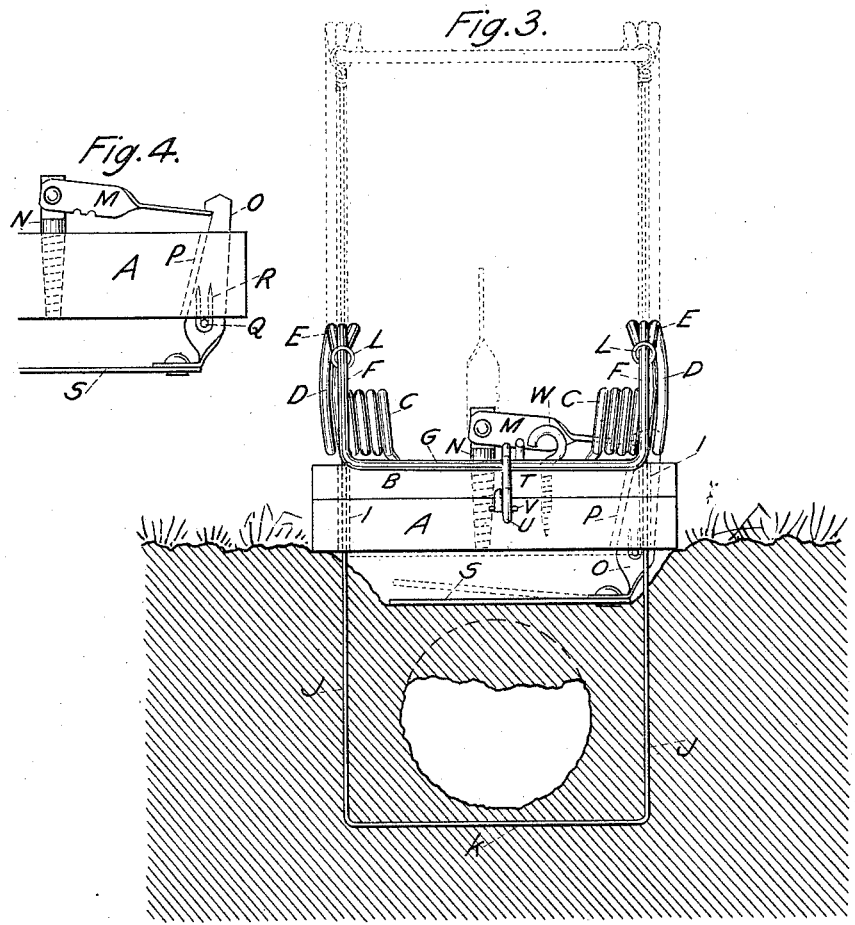

UNITED STATES PATENT OFFICE.

THEODORE H. SCHEFFER, OF MANHATTAN, KANSAS.

MOLE-TRAP.

1,049,406.　　　　Specification of Letters Patent.　　Patented Jan. 7, 1913.

Application filed February 28, 1912. Serial No. 680,537.

(DEDICATED TO THE PUBLIC.)

*To all whom it may concern:*

Be it known that I, THEODORE H. SCHEFFER, a citizen of the United States of America, and an employee of the Department of Agriculture of the said United States, residing at Manhattan, in the county of Riley, State of Kansas, (whose post-office address is Manhattan, Kansas,) have invented a new and useful Improvement in Mole-Traps.

This application is made under the act of March 3, 1883, chapter 143 (22 Stat., 625), and the invention herein described and claimed may be used by the Government of the United States, or any of its officers or employees, in the prosecution of work for the United States, or by any person in the United States, without the payment of any royalty thereon.

My invention relates to devices for trapping moles.

The object of my invention is to provide a trap that is portable, inexpensive and simple in construction, and easy of operation. The efficiency of any trap depends upon its being so constructed as to adapt itself to the habits of the animal it is designed to capture. My invention conforms to such requirements in that it can be set without exciting the animal's suspicions by introducing anything into its burrow and is sprung by the mole in following its natural instinct to reopen its passageway when trodden by passing feet or otherwise obstructed.

The object, characteristic features and scope of my invention will be more readily understood from the following description, taken in connection with the accompanying drawings, forming a part hereof, wherein:

Figure 1 is a top view of the trap, showing the catching mechanism in a set position. Fig. 2 is a side view of the device, showing the trap set,—the dotted lines illustrating the position of the trap when sprung. Fig. 3 is an end view of the same,—the dotted lines illustrating the position of the mechanism when sprung; and Fig. 4 is an enlarged detail view of the trigger mechanism.

Referring to the drawings, A represents a base, consisting of hard, tough wood or other suitable material, having beveled ends, B B. Secured to the top, near each end, of the base, A, are two steel wire springs with spiral coils, C C, having integral upwardly extending transverse arms, D D, with circular turns or loops, E E, formed at their tops and then having outwardly extending portions, F F, parallel to the base, A, thus constituting supports for the integral bridges or cross pieces, G G. Each set of the springs, C C, arranged near each end of the base, A, together with the upwardly extending transverse arms, D D, circular turns or loops, E E, extensions, F F, and bridges or cross pieces, G G, forming the framework of said springs, are made of but one piece of strong, durable, steel wire. The springs, C C, are secured to the base, A, by having one end of said springs bent at right angles and driven into said base, and then further held rigid by staples, H H, as shown in Fig. 2 of the drawings.

Holes or openings, I I, are bored through the base, A, near each end, for the reception of a pair of choker wires, J J. These choker wires are adapted to move up and down through said holes when the trap is sprung or set. Said chokers are made, respectively, of one piece of hard wire, but any other suitable material may be employed in their construction. The chokers, J J, are provided with integral cross pieces, K K, at their bottoms and have eyes, L L, formed at their tops through which the extensions, F F, pass for supporting said choker pieces. In construction, the eyes, L L, are formed by bending the ends of the choker wires, J J, over the extensions, F F, and by winding said ends around the choker pieces as shown in Fig. 2.

M represents a tongue which is movably secured to the post, N, rigidly fixed in the center of the base, A, and O designates the trigger of the mechanism movably set in the slot or opening, P, cut in the side of said base. In the bottom of the tongue, M, notches are cut, as shown in the drawing, in order that the detents, hereinafter referred to, may fit therein and be held firmly when the mechanism is in a locked position. The trigger, O, rests on a small pin, Q, which passes through an aperture in said trigger, near its lower end. The pin, Q, is secured to the bottom of the base, A, by means of staples or cleats, R R, as illustrated in Fig. 2. Riveted to the bottom of the trigger, O, is a plate, S, against which pressure is brought for releasing the trigger when the device is set.

T T represent the detents of the trigger mechanism provided at one end with eyes or loops, U U, through which pass staples or cleats, V V, for securing said detents to each end of the base, A, below the beveled edges. The detents, T T, are slightly bent at the ends which are attached to the base, A, so as to avoid the beveled edges, B B, from interfering with their function in locking the spring mechanism of the trap.

A safety hook, W, is secured near the center of the base, A, and is employed for holding the free ends of the detents, T T, in place while the trap is being set or to prevent the detents from swinging around after the trap is sprung.

In setting the trap, the springs, C C, are depressed by bringing the bridges or cross pieces, G G, down so that they rest on the beveled edges, B B. This action causes the supports, F F, to force the choker wires, J J, through the holes, I I, full length below the base, A, and the loops, E E, prevent the choker rods from sliding over the arms, D D, as the supports, F F, slide through the eyes, L L, in such downward movement. The detents, T T, are then turned over the bridges or cross pieces, G G, and hooked under the safety catch, W. When this operation is completed, two slits are made in the sod, at right angles to the mole's runway, for the reception of the choker wires, J J. A knife may be used for this purpose, but in ordinary cultivated soil the trap may be set without making the slits. Half way between the slits, the roof of the mole's runway is depressed sufficiently to permit the admission of the trigger plate, S. The trap is then placed in position in the soil with the choker wires in the slits so made and the trigger plate, S, in the depressed portion of the runway. The detents, T T, are then released from the safety catch, W, and placed under the tongue, M, which engages the notch of the trigger, O. When the mole passes under the base, A, and raises the soil beneath the trigger plate, S, the tongue, M, is instantly released from the notch of the trigger, O, thus springing the trap, thereby causing the mole to be caught under one of the cross bars, K K, according to which side he encounters the apparatus. When the trap is sprung, the extensions, F F, throw the choker wires, J J, up as illustrated by the dotted lines in Fig. 2 of the drawings. These extensions are not only employed in my invention as means for supporting the choker wires, J J, but the same are specially adapted for carrying or throwing said choker wires upward with force and rapidity when the trap is sprung. The upward movement of the choker wires is delayed until the eyes, L L, have had contact with the cross bars, G G. The cross bars, G G, at one end of the extensions, F F, and the loops, E E, formed at the other end provide means for preventing the choker wires from becoming detached from said extensions, while the construction of the spring arms with sloping extensions in manner as herein disclosed avoids the tendency of the choker wires to bind in the apertures of the base.

Having thus described my invention I claim:

1. In an animal trap, comprising a base, a double spring arm thereon having its outer ends downward turned at an angle to the length of the arm and provided with a cross bar, a choker wire slidably engaging the down turned ends, a detent engaging the cross bar and a trigger mechanism to hold the detent in set position, substantially as described.

2. In an animal trap, comprising a base, spring arms thereon formed with an integral eye near their outer ends and then extended forwardly at an angle to the direction of the length of the arms so that when they are in set position the eye will be raised from the base, a cross bar connecting the outer ends of said arms, a choker wire slidably engaging the said outer ends, a detent for engaging the cross bar and a trigger mechanism to hold the detent in set position, substantially as specified.

In testimony whereof, I affix my signature in the presence of two subscribed witnesses.

THEODORE H. SCHEFFER.

Witnesses:
CLARENCE G. BIRDSEYE,
FRANK L. EARNSHAW.

Copies of this patent may be obtained for five cents each, by addressing the "Commissioner of Patents, Washington, D. C."